US008386096B2

(12) United States Patent (10) Patent No.: US 8,386,096 B2
Stimac et al. (45) Date of Patent: Feb. 26, 2013

(54) RELATIVE NAVIGATION SYSTEM

(75) Inventors: Lawrence William Stimac, Caledonia, MI (US); Michael Steven Feldmann, Rockford, MI (US); Frank Saggio, III, Grand Rapids, MI (US); Douglas Robert Nichols, Kentwood, MI (US)

(73) Assignee: General Electric Company, Schenectady, NY (US)

( * ) Notice: Subject to any disclaimer, the term of this patent is extended or adjusted under 35 U.S.C. 154(b) by 654 days.

(21) Appl. No.: 12/644,743

(22) Filed: Dec. 22, 2009

(65) Prior Publication Data

US 2011/0153205 A1 Jun. 23, 2011

(51) Int. Cl.
*G05D 1/02* (2006.01)
*G05D 1/08* (2006.01)
(52) U.S. Cl. ............... 701/4; 701/300; 356/22; 348/136
(58) Field of Classification Search ................ 701/4, 13, 701/300, 519; 348/136, 117; 180/167, 168; 702/150, 151, 152, 153; 356/616, 622, 617
See application file for complete search history.

(56) References Cited

U.S. PATENT DOCUMENTS

| | | | | |
|---|---|---|---|---|
| 4,710,028 A * | 12/1987 | Grenier et al. | ................. | 356/620 |
| 5,291,195 A * | 3/1994 | Gross | ............................ | 340/958 |
| 6,275,751 B1 * | 8/2001 | Stallard et al. | .................. | 701/13 |
| 6,278,917 B1 * | 8/2001 | Bauer et al. | ...................... | 701/23 |
| 6,504,610 B1 * | 1/2003 | Bauer et al. | .................... | 356/399 |
| 6,580,821 B1 | 6/2003 | Roy | | |
| 6,845,303 B1 * | 1/2005 | Byler | ............................... | 701/13 |
| 7,093,801 B2 * | 8/2006 | Schroeder | ................ | 244/135 A |
| 7,293,743 B2 | 11/2007 | Cepollina et al. | | |
| 7,345,627 B2 | 3/2008 | Zimmerman et al. | | |
| 7,345,743 B1 | 3/2008 | Hartman et al. | | |
| 2004/0032596 A1 * | 2/2004 | Lange et al. | .................. | 356/622 |
| 2008/0067290 A1 | 3/2008 | Mickley et al. | | |

OTHER PUBLICATIONS

R. M. Haralick et al., "Review and Analysis of Solutions of the Three Point Perspective Pose Estimation Problem," International Journal of Computer Vision, 13, 3, pp. 331-356 (1994), Kluwer Academic Publishers, Manufactured in The Netherlands.
Xiao-Shan Gao et al., "Complete Solution Classification for the Perspective-Three-Point Problem," IEEE Transactions on Pattern Analysis and Machine Intelligence, vol. 25, No. 8, Aug. 2003, Published by the IEEE Computer Society.

\* cited by examiner

*Primary Examiner* — Darnell Jayne
*Assistant Examiner* — Sasha T Varghese
(74) *Attorney, Agent, or Firm* — McGarry Bair PC

(57) ABSTRACT

A relative navigation system projecting a grid into space from a first object a grid that is repeatedly detected from a second object having a second relative reference frame and using range and attitude between the objects to adjust the attitude or range of at least one of the first and second objects.

12 Claims, 8 Drawing Sheets

RELATIVE NAVIGATION SYSTEM

BACKGROUND OF THE INVENTION

This invention relates generally to the field of relative navigation systems and methods of relative navigation.

Relative navigation systems are useful for various applications such as autonomous vehicle navigation, mid-air refueling, and space docking. In some applications, only the range between two objects is required. In other applications, both the range and the relative attitude (pitch, yaw, and roll) between two objects are required. Such information is typically gathered as a time series and used to make course corrections in one or more of the objects to enable a desired maneuver or final relative position.

Some applications benefit from a minimal form factor and weight, as well as, highly reliable operation often in harsh environments of a relative navigation system.

Capture and servicing a space satellite is an example of an application where a relative navigation system can be used. In such application, both the range and the attitude measurements between the target satellite and the chase vehicle are required to allow proper orientation during capture. Additionally, this application is in an extreme environment and excess weight and volume of the satellite or chase vehicle can add to the cost of such operations.

Another application may be autonomous vehicle navigation in a warehouse or factory environment. In such an application high reliability and low cost are desirable.

BRIEF DESCRIPTION OF THE INVENTION

In one embodiment, a relative navigation system for at least two objects, comprising a grid generator, a detector array, and a controller. The grid generator on one of the at least two objects projects into space a plurality of lines forming a grid defining a first relative reference frame associated with a first origin point on the first object. The detector array on the other of the at least two objects detects at least a portion of the grid and provides an output. A controller provided on the other of the at least two objects, receives the output, and determines at least one of a relative range and attitude between the first and second objects based on the output.

DETAILED DESCRIPTION OF THE INVENTION

The present invention is related to methods and apparatus for determining the range and relative attitude of two objects. This relative navigation system has various applications including automated vehicle navigation, mid-air refueling, space vehicle docking, and space satellite capture and servicing.

Figure 1:
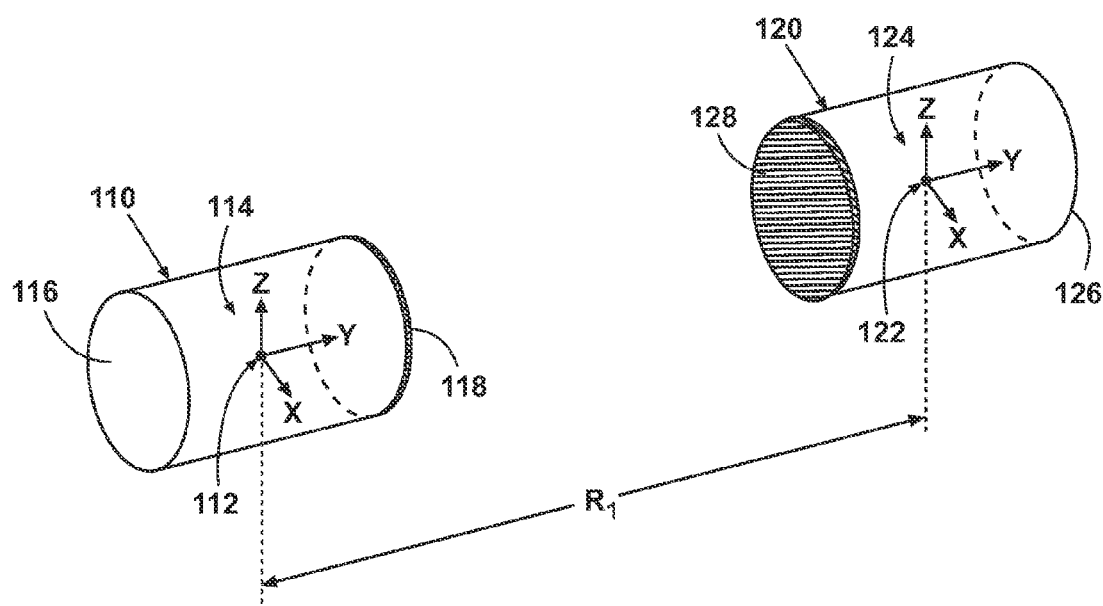
FIG. 1 is a schematic illustration of first and second objects, each having their own relative reference frame, and capable of navigation according to an embodiment of the invention.

The invention will initially be described in the context of two docking objects 110 and 120, which are schematically illustrated in FIG. 1. The embodiment of FIG. 1 may be analogized to a mid-air refueling scenario, a space vehicle docking scenario, and a space satellite capture and servicing scenario. In all three of these scenarios, both objects are moving. However, either one of the objects 110 and 120 could be fixed or non-moving, with the other of the objects 110 and 120 moving, such as in an automated vehicle navigation, e.g. an airplane landing at an airport or a vehicle moving within a warehouse. It is also possible for the objects 110 and 120 to both be moving, and the relative navigation system may be used to maintain a desired attitude between the two objects without the two objects being docked, mated, coupled, etc., as the case may be. The docking scenario is selected because it is believed to provide the most detailed description.

The first object 110 has a first coordinate system 114 based on a first origin 112, within the body. Similarly, the second object 120 has a second coordinate system 124 based on a second origin 122. The location of the origins 112 and 122 may be at any desired location within the corresponding object and need not be coincident with a center of gravity or center of geometry of the object 112 and 122. However, in many cases, it is beneficial to locate the origin at either the center of gravity or the center of geometry. It is beneficial to select a known origin because then any location on the body can be determined relative to a known origin.

Each of the objects 110, 120 have corresponding surfaces 118, 128 respectively, which mate when the objects are docked. Each of the objects 110, 120 also includes a back surface 116 and 126, respectively. Therefore, the relative navigation between the objects 110, 120 requires that the objects be oriented facing each other and then brought into contact. In such a docking operation, it is useful to determine both the range and the time rate of change of the range between the first object 110 and the second object 120. The range is illustrated as the distance between the first origin 112 of the first object and the second origin 122 of the second object, shown as $R_1$. However, the range could be the distance between any other two points, which can easily be determined by relative reference to the distance between the origins 112, 122.

Additionally, the relative attitude and preferably the relative attitude rate between the first object 110 and the second 120 must be determined. The attitude is the pitch, yaw and roll of an object relative to a reference frame, which may be either of the reference frames 112, 122, for example. The relative attitude information is required to change the orientation of either the first object 110 or the second object 120, or both, such that the first front surface 118 of the first object 110 is correctly aligned with the second front surface 128 of the second object 120 as the two objects 110 and 120 approach each other for docking.

In one embodiment, the range and the relative attitude between the first object 110 and the second object 120 may be continuously determined over time, such as with time series data, with some periodicity. One or both of the objects 110, 120 may apply course corrections and/or attitude corrections by way of navigation of one or both of the first and second objects 110 and 120 to ensure proper mating with the correct orientation.

The manner in which the course correction and/or attitude corrections are made are not germane to the invention and will be dependent on the type of vehicle that the objects 110, 120 represent. Any suitable course corrector may be used. For example, where the object 110 is a space station moving in space and the object 120 is a space vehicle, such as a space shuttle, docking with the space station, the object 120 will have various rockets and thrusters for navigation, which may be used as necessary to adjust the attitude of the space vehicle to the space station for docking. In the case of an airplane landing on a runway, the engines and control surfaces of the airplane will provide the course/attitude correction during navigation.

Figure 2:
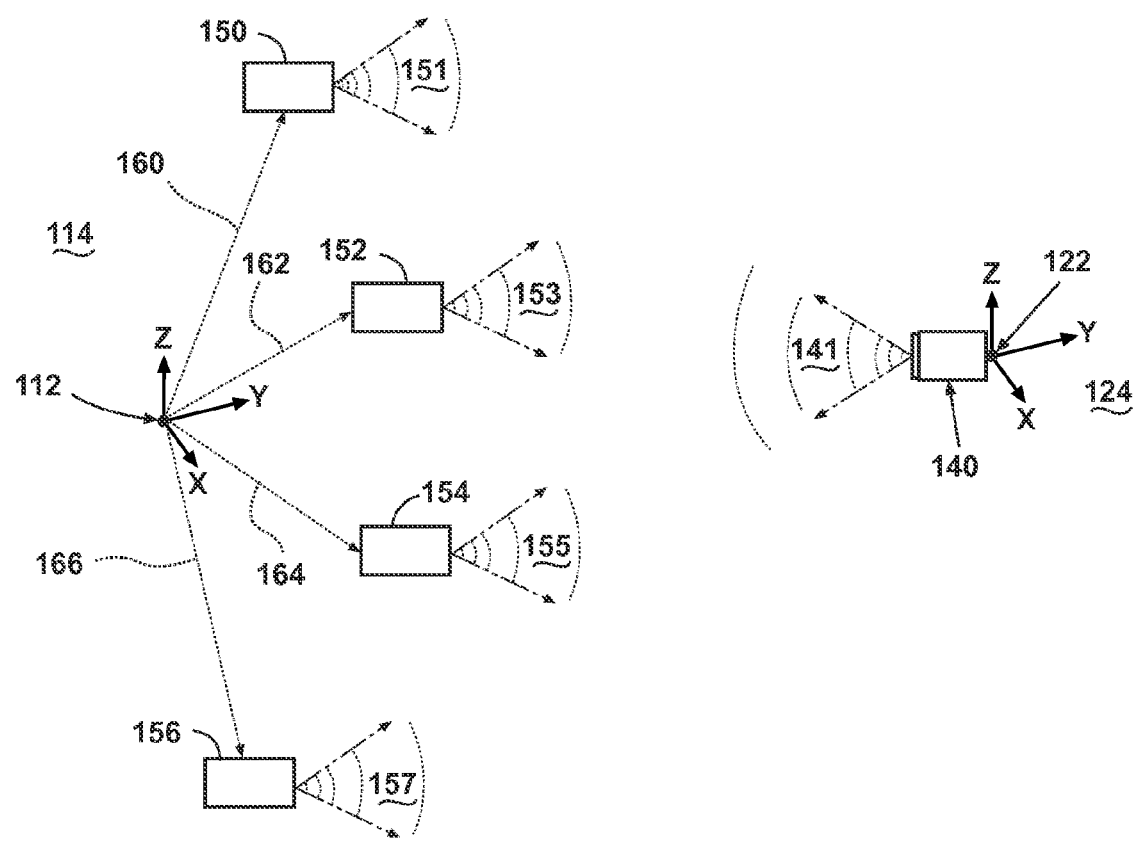
FIG. 2 is a schematic view of the relative navigation system according to an embodiment of the invention.

FIG. 2 represents one embodiment of the present invention to determine the range and the relative attitude of the two objects (not shown here). The embodiment comprises a grid generator 140 and a detector array comprised of detector modules 150, 152, 154, and 156. The grid generator 140 projects a grid, such as a plurality of intersecting lines, into space within a field of transmission 141. For convenience, the field of transmission 141 originates from the second object at the origin 122 of the reference frame 124. However, the field of transmission 141 could easily originate from a known location spaced from the origin 122.

The detector array comprises multiple detector modules for detecting the grid generated by the grid generator 140. In this embodiment, four detector modules 150, 152, 154, and 156 are carried by the first object 110 at some known position 160, 162, 164, and 166 respectively, from the origin of the first object 114. As illustrated in FIG. 2, all of the detector modules are in a non-collinear distribution. In other embodiments, it is contemplated that at least one of the detector modules is positioned in a non-coplanar distribution to the other detector modules. The detector modules may also be both non-collinear and non-coplanar, which will provide the most accurate mathematical results.

The detector modules 150, 152, 154, and 156 further have a field of detection 151, 153, 155, and 157 respectively. For relative navigation between the objects 110, 120, it is presumed that the field of detection 151, 153, 155, and 157 of at least one of the multiple detector modules 150, 152, 154, and 156 lie within the field of transmission of the grid generator 140, enabling at least one of the detectors to "see" the grid. For best performance, the field of detection 151, 153, 155, and 157 of all of the detector modules 150, 152, 154, and 156 lie within the field of transmission of the grid generator 140.

Figure 3:
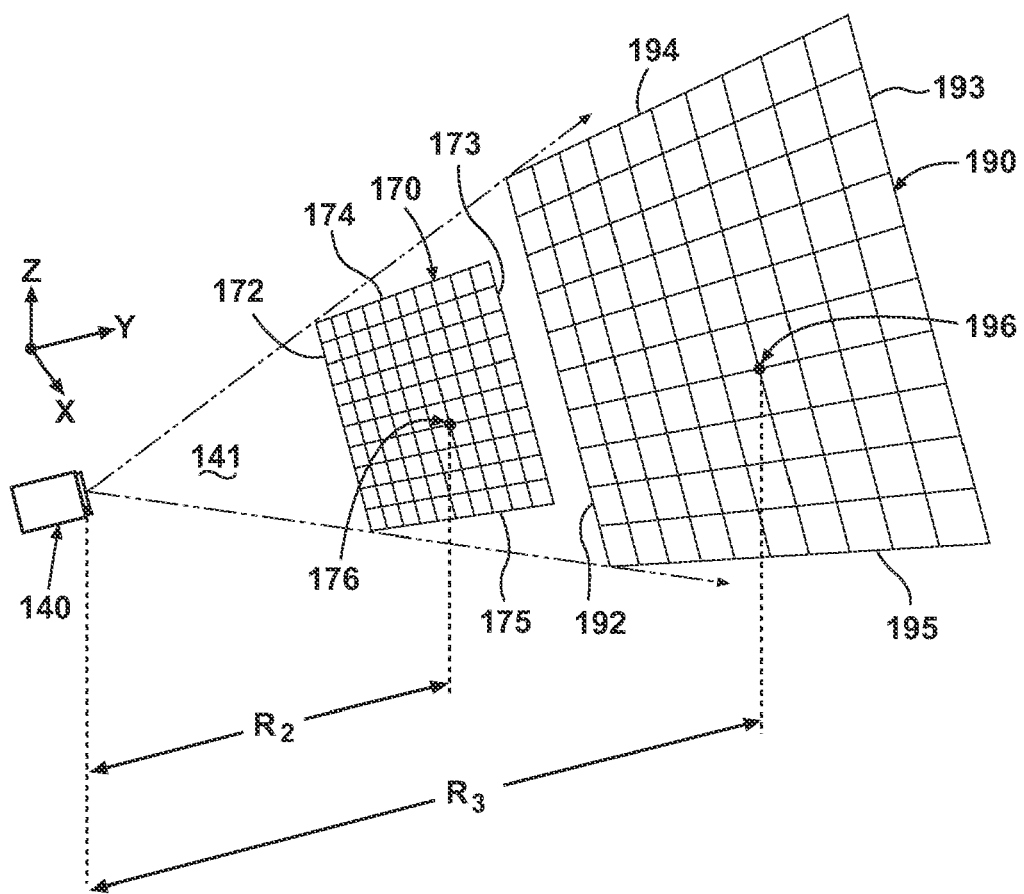
FIG. 3 is a view of a grid projected into space from the grid generator for use with the navigation system of FIG. 2.

FIG. 3 shows the grid as projected into space from the grid generator 140 with a field of transmission 141. As illustrated, the projected grid comprises intersecting lines. At some distance away from the grid generator 140, these intersecting lines are observed as a grid in space, with the size of the grid increasing away from the grid generator 140.

For description purposes, the grid generator can be thought of as projecting intersecting lines substantially in the y direction of the coordinate system. If one were to observe the projection of intersecting lines in the x-z plane at some distance $R_2$ away from the grid generator 140, one would observe at first grid 170. If one were to observe the same projection of intersecting lines at a distance $R_3$, which is greater than the first distance $R_2$ in the x-z plane, one would observe a second grid 190, which appears relatively larger than the grid 170.

The first grid 170 at distance $R_2$ away from the grid generator 140 is spatially bound in the horizontal direction by a first vertical line 172 and a second vertical line 173. There exists a plurality of vertical lines spatially and temporally generated in between the first vertical line 172 and the second vertical line 173. The first grid 170 at a distance $R_2$ away from the grid generator 140 is spatially bound in the vertical direction by a first horizontal line 174 and a second horizontal line 175. There exists a plurality of horizontal lines spatially and temporally between the first horizontal line 174 and the second horizontal line 175.

The distance $R_2$ can be any distance between the grid and the grid generator. For convenience, the distance is determined between a point 176 on the first grid 170 and the grid generator as shown.

The vertical and horizontal lines may be formed in any suitable manner by the grid generator 140. For example, all of the lines may be formed sequentially or all at once. Either one of the vertical lines or horizontal lines may be formed before the other. The grid generator may alternate between vertical and horizontal lines. When the grid generator 140 uses a scanning laser to form the grid, the laser will sequentially form all of one of the vertical and horizontal lines, followed by the sequential forming of the other of the vertical and horizontal lines. The rate at which the lines are sequentially formed may be so fast that for practical purposes, it is as if all of the grid lines were simultaneously formed.

The second grid 190 at distance $R_3$ away from the grid generator 140 is for all practical purposes the same as the first grid 170, but at further distance from the grid generator 140 than the first grid 170. The grid 190 is spatially bound in the horizontal direction by a first vertical line 192 of the second grid 190 and a second vertical line 193 of the second grid 190. There exists a plurality of vertical lines spatially and temporally generated in between the first vertical line 192 of the second grid and the second vertical line 193 of the second grid. The second grid 190 at a distance $R_3$ away from the grid generator 140 is spatially bound in the vertical direction by a first horizontal line 194 of the second grid 190 and a second horizontal line 195 of the second grid 190. There exists a plurality of horizontal lines spatially and temporally between the first horizontal line 194 of the second grid and the second horizontal line 195 of the second grid. A point 196 on the second grid 190 is shown.

The similarity of the grids 170 and 190 becomes apparent in the case of projected grid lines, where the grid 190 is formed by the same lines forming the grid 170, except the grid 190 is observed at a further distance from grid generator 140, making the grid 190 appear larger than the grid 170. In this sense, the grid 190 is the appearance of the grid lines generated by the grid generator at the distance $R_3$ whereas the grid 170 is the appearance of the grid lines at the distance $R_2$. Thus, as object 110 approaches object 120, the grid seen by the object becomes smaller.

The grids 170 and 190 may be of any number of lines. As illustrated, they are comprised of ten vertical lines by ten horizontal lines. A grid comprised of a greater number of intersecting lines may result in improved detection angular resolution for a fixed field of transmission 141 and distance from the detector 140 than a grid comprised of a fewer number of intersecting lines. The grids 170 and 190 are depicted as a square shape, but this is not a requirement for the methods and apparatus of this invention. The grid can be any shape including rectangular, oval, or circular. Furthermore, the intersecting lines of the grids 170 and 190 are depicted as orthogonal; however, this is not a requirement for the methods and apparatus of the present invention. The angles between the intersecting lines may be right angles, acute angles, or obtuse angles in different parts of the grid.

Although, examples shown use Cartesian coordinates, any appropriate coordinate system may be used including polar, cylindrical, or spherical coordinate systems for both grid generation and for grid detection. For example, to form a grid amenable to polar coordinate representation, a series of concentric circles and lines radiating out from the center of those circles may be projected by the grid generator into space.

The radiation source for the plurality of projected lines may be a coherent or incoherent radiation source. For example, when the radiation source is a coherent source, it may be a solid state laser that emits radiation at a wavelength in the near-UV range. Additionally, the radiation intensity may be selected, or attenuated by use of an optical filter, to reduce the risk of eye damage.

Figure 4:
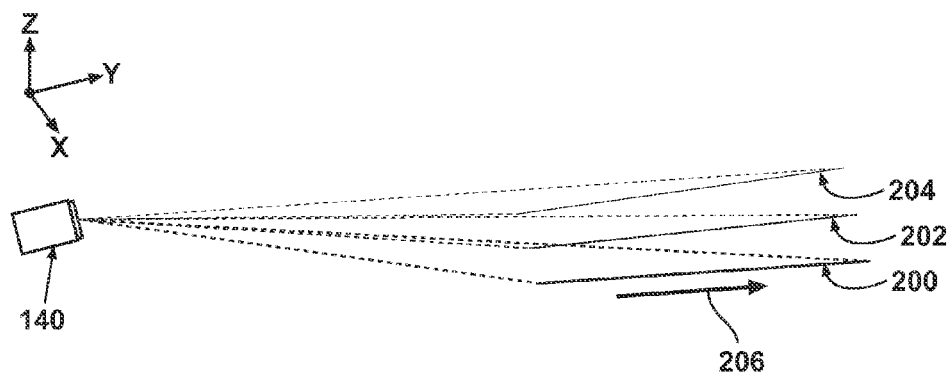
FIG. 4 is a view of several horizontally scanned lines that comprise the projected grid generated by the grid generator of FIG. 3.
Figure 5:
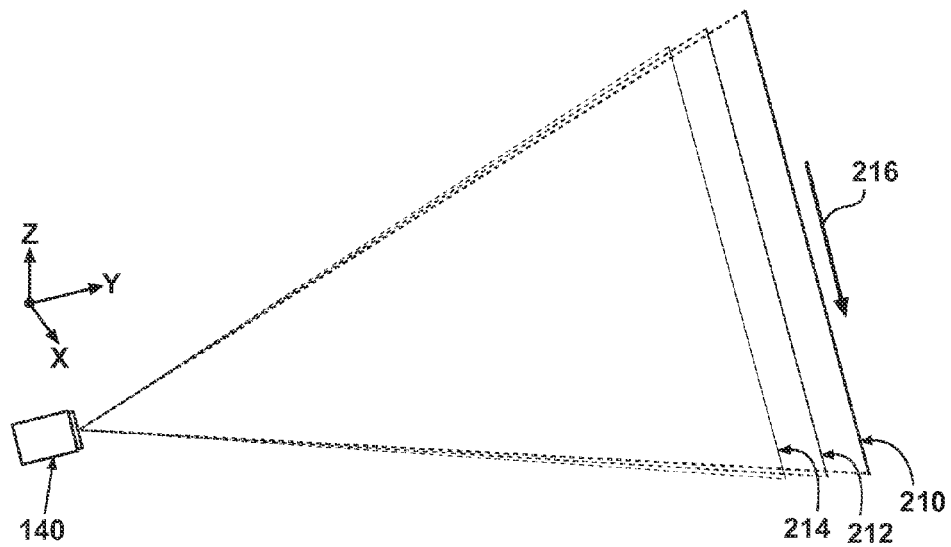
FIG. 5 is a view of several vertically scanned lines that comprise the projected grid generated by the grid generator of FIG. 3.

The grid of intersecting projected lines may be generated by raster scanning each of the lines or by projecting and scanning an elongated radiation beam. FIGS. 4 and 5 depict one embodiment of how the grid generator 140 generates the vertical and horizontal lines. In this embodiment, the grid generator 140 raster scans horizontal line 200 in the direction indicated by arrow 206. The grid generator then steps to the next line location and raster scans the subsequent horizontal line 202, again in the direction of 206. This process is repeated for the next line 204 and all subsequent lines until all the horizontal lines are scanned. The vertical lines are scanned in a similar manner with a first vertical line 210 raster scanned in the direction indicated by arrow 216, followed by stepping and repeating the process for the next vertical lines 212 and 214 and all subsequent vertical lines. Additional methods and apparatus for generating the intersecting lines are described in detail in US patent publication 2008/0067290, the contents of which are incorporated herein by reference in its entirety.

A grid word may be encoded at one or more locations of the grid. By grid word, it is meant that the structure or characteristic of the grid provides data or information that may be read or detected by the detector modules. In one embodiment, the projected lines comprising the series of projected intersecting lines are further encoded with a different grid word in different regions of the grid to indicate regions within the grid of intersecting lines. One manner of encoding of the grid word is by modulating the beam in the case of a laser being used to form the grid. The modulation is achieved by changing the intensity of the beam and/or blocking the beam with some periodicity.

Figure 6:
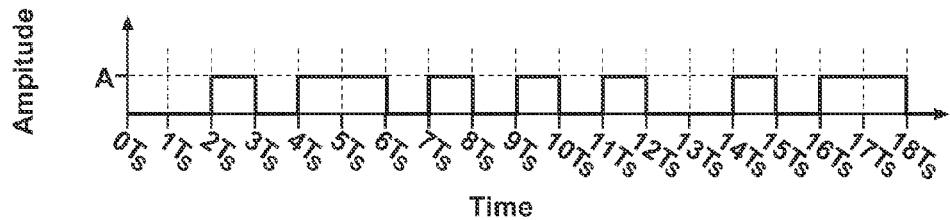
FIG. 6 is a representation of one embodiment of the modulation of the scanned lines for use in the grid of FIG. 3.

FIG. 6 illustrates an amplitude modulation scheme to modulate and encode scanned lines with a grid word. The amplitude modulation scheme may be applied to a single line or to multiple lines forming the grid. In this embodiment, the period of each bit is time $T_s$, with a logical '1' bit represented by a beam intensity of A and a logical '0' bit represented by a beam intensity of 0. This embodiment further shows a grid word comprised of 18 bits transmitted over a time of $18T_s$. Some of these bits may be data bits for encoding the location on the grid and other bits might be grid word start or stop indicators or error checking bits. Thus, as the detector module monitors the amplitude of the line over time, a processor or circuitry associated with the detector may be used to determine the word contained in that location of the grid.

Each of the intersecting projected lines could be encoded differently or a grouping of intersecting lines could be encoded similarly. Additionally, the grid word could be comprised of any number of bits, including any number of start or stop bits, data bits, or error checking, correction or parity bits. The data bits may encode each of the vertical and horizontal lines with a unique sequence of bits. Upon detection of these bits by the detector module and processing by the processor, microcontroller, or other circuitry, the location within the grid can be determined Any number of known modulation methods could be used for encoding the grid words on to the plurality of intersecting projecting lines, including but not limited to, amplitude modulation (AM), frequency modulation (FM), quadrature amplitude modulation (QAM), or combinations thereof.

In another embodiment, the modulated projected lines may be used as a communication link from the object with the grid generator to the object with the detector array. This link can be used to send messages other than just information on locations within the grid. For example, the modulated grid lines may be used to send messages such as conveying where in the grid the first object may want the second object to park, or to wait for further commands. The link can be used to send limited amounts of information by time-multiplexing the information in the grid word. This generalizes the grid as a data link.

Figure 7:
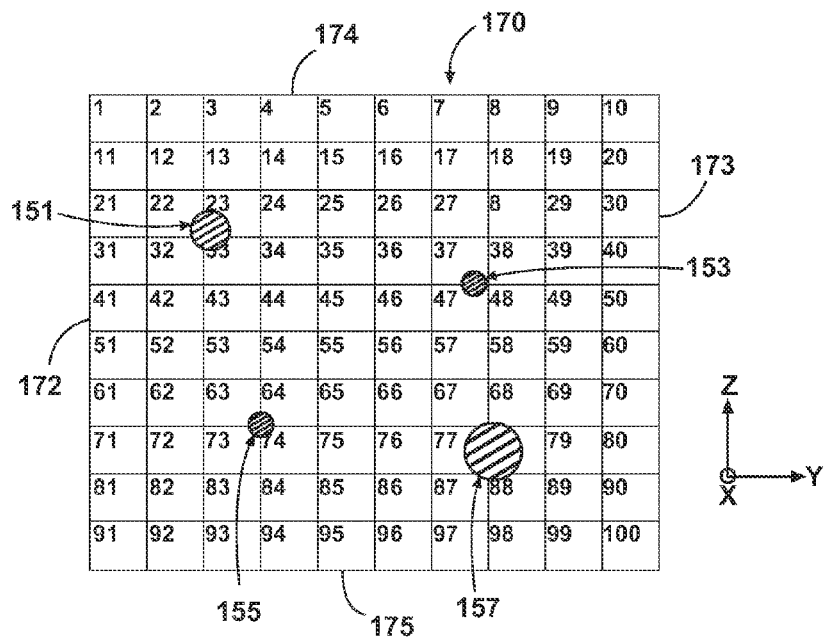
FIG. 7 is a schematic view of the grid projected into space and the location of the detector modules within the grid.

FIG. 7 illustrates a view of the grid of intersecting projected lines 170 from the normal direction bound by vertical lines 172 and 173 and horizontal lines 174 and 175 with the field of view 151, 153, 155, and 157 of each of the detector modules 150, 152, 154, and 156 (as shown in FIG. 2). In this embodiment each of the vertical and horizontal lines are encoded such that each of the regions within the grid, 1 through 100, can be identified. The four detector modules are in a non coplaner configuration with a resulting non coplaner configuration of the field of view 151, 153, 155, and 157 of each of the detector modules. The circles in FIG. 7 illustrating the field of view are of different sizes because the non-coplanar spacing of the detectors will yield a different area, which is defined as the intersection of the field of view with the grid.

Each detector module produces an output signal based upon the line or lines that pass through the field of view of the detectors. The field of view may be controlled by selecting the aperture for each detector. It is possible for each detector to have a different field of view. When a word is embedded in the grid, the field of view of the detector must at least be large enough such that a projected line is within that field of view long enough to detect the transmission of a complete grid word associated with the line intersecting the detector module. Thus, the field of view of the detector may be several times the size required to detect a complete grid word of a line passing through the field of view of the detector, to ensure reliable detection.

The output signals of each of the detectors are then demodulated and processed to determine the location of the detector within the projected grid of intersecting lines. The demodulation may be conducted by a processor, field programmable gate array (FPGA), application specific integrated circuit (ASIC) or similar computer coupled to the detectors.

The embodiment disclosed herein measures range by counting the number of bit transitions with periodicity $T_S$ of the grid word detected at each detector module. Alternatively, one could count the number of lines seen by one or more of the detector modules. However, this approach is limited to the angle of view of the detectors whereas by looking at the bit transitions, it is possible to identify the spot on the grid seen by the detector, which works better when the objects are close enough that each detector can only see one line. The method also takes into account that the number of bit transitions detected will also be affected by the relative attitude of the detector module to the grid generator.

Figure 8:
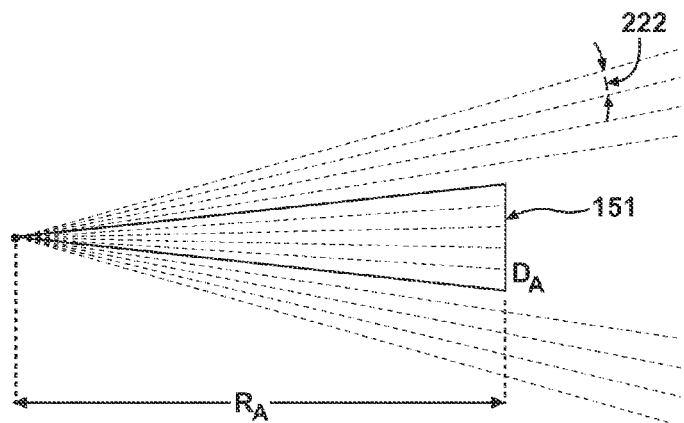
FIG. 8 is a schematic view of a projected beam scanned over the detector module field of detection.

FIG. 8 illustrates one of the detectors with a field of detection and the portion of the grid that falls within the field of detection. As can be seen, the grid generator scans the projected line at an angular rate of $\omega_s$. The angle subtended in one cycle time $T_s$ 222 is $\omega_s T_s$. The number of bit transitions detected by the detector module is given by the following relationship:

$$N_S = \frac{\operatorname{Tan}^{-1}\left(\frac{D_A}{R_A}\right)}{\omega_S T_S}$$

Where $D_A$ is the dimension of the field of detection 151 of detector module 150.

$N_S$ is the number of bit transitions detected by the detector module.

$R_A$ is the distance from the grid generator 140 to the detector module.

Solving for $R_A$ gives the following relationship:

$$R_A = \frac{D_A}{\operatorname{Tan}(N_S \omega_S T_S)}$$

Figure 9:
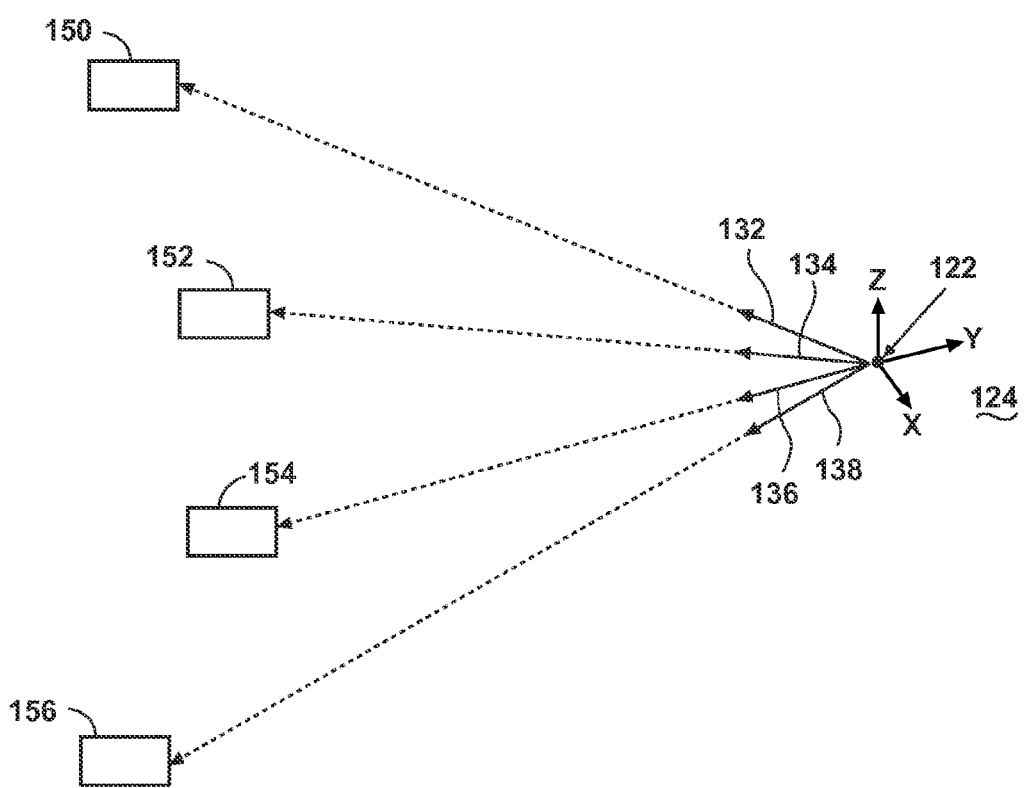
FIG. 9 is a schematic of unit vectors from the reference frame of the second object to each of the detector modules on the first object.

The position vector to each of the detectors is given by:

$$R_i = \begin{bmatrix} u_x^d \\ u_y^d \\ u_z^d \end{bmatrix} R_A$$

Where i indexes each detector and $u^d_x$, $u^d_y$, and $u^d_z$ are the x, y, and z components of the unit vectors in the reference frame 124 of the second object 120 in the direction of each of the detectors as shown in FIG. 9. Each of the vectors 132, 134, 136, and 138 from the origin 122 of the reference frame 124 of the second object 120 is shown. The x, y, and z components of each of these unit vectors for each of the detectors is represented by $u^d_x$, $u^d_y$, and $u^d_z$, respectively and are derived from grid angle information.

The position vectors from all the detector modules are processed using an Absolute Orientation algorithm which determines the relative attitude direction cosine matrix between the coordinate frame defined by the grid generator 140 on the second object 120 and the coordinate frame on the chase vehicle in which the vectors to the detector positions is defined. The distance from the second object to each detector i on the first object is given by the equation:

$$R_i = C_B^R D_i + r_i$$

Where $C^R_B$ is the relative attitude direction cosine matrix;

$D_i$ is the distance from the origin 112 of the first object 110 to each detector module i on the first object 110, and is a fixed and measurable quantity that is the scalar length of vectors 160, 162, 164, and 166 between the origin 112 of the first object and each of the detectors as shown in FIG. 2; and $r_i$ is the distance between grid generator 140 and origin 122 of the coordinate frame 124 and the origin 112 of the coordinate frame 114 of the first object 110.

The method solves for the relative attitude direction cosine matrix, $C^R_B$ given the grid generator 140 measurements, $R_i$ and the fixed distances, $D_i$. A minimum of three and preferably four measurement pairs $\{R, D\}_i$ are required for the solution. In one embodiment, the Horn Algorithm is used to solve the relative attitude direction cosine matrix; however, any other known methods may be used for this solution.

Multiple determinations over time of the direction cosine matrix may provide the basis for determining the rate of change in the attitude between the first object 110 and the second object 120. At least two direction cosine matrices must be determined to calculate a rate of change. A sampling rate for determining the position data and the corresponding direction cosine matrix will be selected based on the anticipated environment and rate of change such that the resulting attitude rate change will provide useful data.

In one embodiment the attitude rate can be determined from back differencing the relative attitude direction cosine matrix. A time series of attitude rates can be determined from the time series of relative attitude direction cosine matrices. The particular method for conducting the back differencing is not germane to the invention. Any suitable method may be used to obtain the attitude rate.

A Kalman Filter may be used to estimate the relative position of the origin of the first object 112 to the origin of the second object 122, as well as the relative velocity from multiple position observations as disclosed above. Each orthogonal element of the position measurement may be processed with a multi-state Kalman filter to estimate the relative position, velocity and possibly other parameters such as acceleration between the first object 110 and the second object 120. Methods other than multi-state Kalman filter may be used to make these calculations. In one embodiment, the algorithms described are executed in a processing unit 142 such as a microprocessor or a microcontroller as shown in FIG. 10.

It may be advantageous in certain applications and system designs to have a greater field of detection of the detector module ($D_A$). In one embodiment, the detection module may be comprised of a detector of the radiation emitted by the grid generator 140 and one or more optical elements to enhance the field of detection of the detector module. As an example the detector may be a silicon based photodetector. The one or more optical elements of the detector module may comprise mirrors, lenses, or combinations thereof. In another embodiment, the detector module does not comprise any optical elements.

The relative range, velocity, attitude, and rate of attitude determined from the apparatus and methods described herein are used for relative navigation of one or both of the objects 110 and 120. The data may be used for course corrections for purposes of one object approaching the other object, one object approaching the other object at a preferred velocity, one object approaching the other object at a preferred velocity and attitude, for the objects to avoid each other or to maintain a required distance or orientation between the objects.

Figure 10:
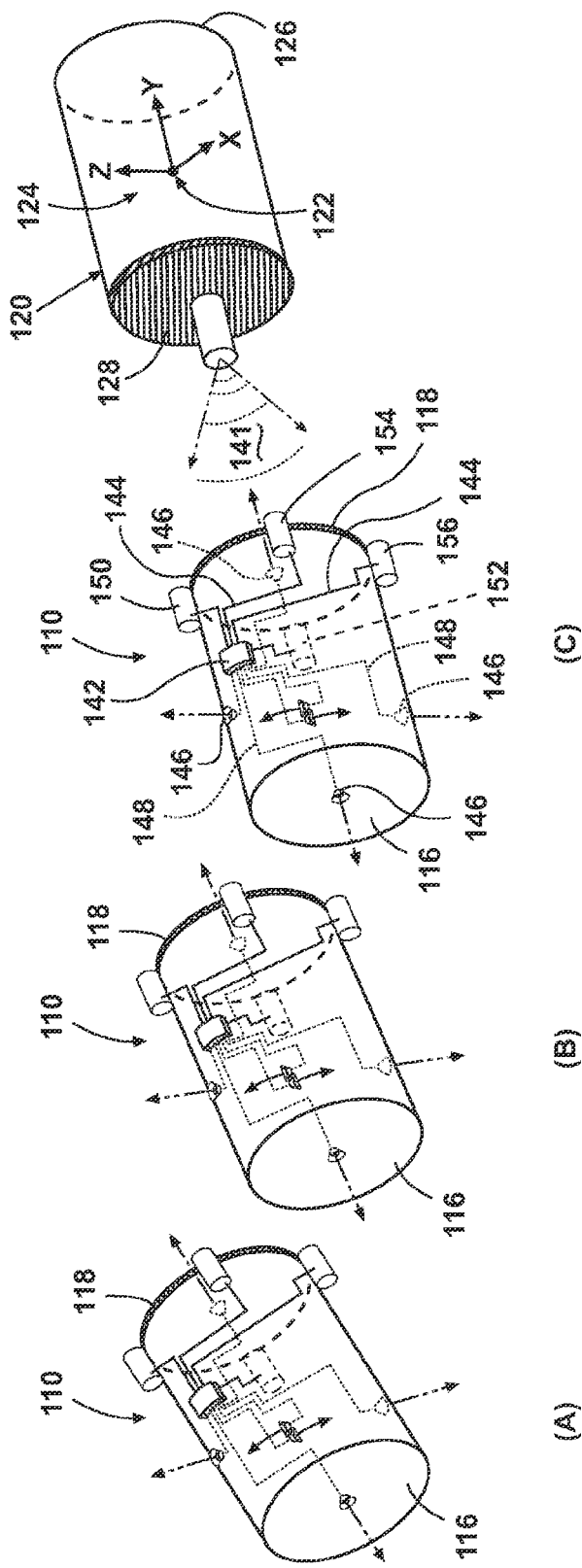
FIG. 10 is a schematic demonstrating the operation of the relative navigation system according to one embodiment of the invention.

FIG. 10 shows an example of the two objects 110, a chase vehicle, and 120, a target vehicle, orienting and docking with each other with the front face 118 of the first object 110 approaching the front face 128 of the second object 120 using the apparatus and following the methods disclosed. The two objects 110 and 120 are initially non-oriented with each other and at a distance as indicated by position A of the first object 110. The grid generator 140 on the second object 120 continuously projects a grid of intersecting lines that is detected by the detector modules 150, 152, 154, and 156 on the first object 110. The outputs of the detectors are communicated to the processing unit 142 by the detector module communications path 144. The outputs of each of the detector modules 150, 152, 154, and 156 are demodulated and processed in the processing unit 142 to determine the range and relative attitude between the two objects 110 and 120 using the algorithms and methods disclosed above. Based upon the relative attitude and range determined, the processing unit may initiate a course corrector, which is illustrated as the firing of one or more thrusters 146, to change the orientation and position of the first object 110 as shown in position B at some time after the object 110 was at position A. The processing unit communicates with the thrusters via a thruster communication path 148. This process is then repeated, with the detector modules 150, 152, 154, and 156 detecting the grid of intersecting lines projected by the grid generator 140 located on the second object 120, with the outputs of the detector modules processed by the processor unit 142 to determine the relative attitude and range between the two objects 110 and 120, and then using this information to initiate course corrections by firing one or more thrusters 146 on the first object 110 to preferentially change the position and orientation of the first object 110. This process is repeated until a final position and orientation of the first object 110 that allows docking with the second object 120 is achieved as shown in position D.

As illustrated in this example, there are two intermittent maneuvering operations shown, however, there may be any number of maneuvering operations. The number of maneuvering operations may depend on the sampling period of the measurements, initial distance between the two objects 110 and 120, or the initial relative attitude of the two objects 110 and 120. The grid generator 140 on the second object 120 and the detectors 150, 152, 154, and 156 and processing unit 142 on the first object 110 may be located on their respective objects to not interfere with the maneuvering or docking process and not incur damage during such operations. The processing unit 142 may comprise one or more processors, microcontrollers, memory devices, digital signal processors, field programmable gate arrays, integrated circuits, discrete electronic components, discrete passive components, circuit boards, electrical connectors, power supplies, or combinations thereof. The detector module communications path 144 and the thruster communications path 148 may be either a protocol or non-protocol based communications path, and may employ any known medium such as twisted pair or coaxial cable, or alternatively communicate wirelessly by any number of known protocols and standards such as ZigBee or Bluetooth.

The aforementioned methodology can be used in substantially the same manner for other applications. For example, in an automated airplane landing on a runway, the processing unit may control airfoils and other control surfaces of the aircraft based on the time series range and attitude data collected, rather than thrusters as in the space docking application.

For illustrative purposes, the relative navigation of two objects is considered and disclosed, but the methods and apparatus disclosed may be used for the relative navigation of multiple objects. It is also obvious that if course corrections are carried out on the object carrying the grid generator (second object 120) rather than the object carrying the array of detector modules (first object 110), or if both objects make course corrections, then the first object must communicate the range and relative attitude time series data to the second object. This communication between the two objects may transpire over a wireless communications channel such as radio frequency communication with the use of a variety of communications protocols on either a unidirectional or bi-directional channel. Alternatively, the communications between the two objects may transpire indirectly via a third party such as a communications satellite with the use of a variety of communications protocols and methods.

The methods and apparatus disclosed produce range and attitude data from a single grid generator on one object and a single array of detector modules on the other object. Two separate hardware setups are not required for the range and the attitude. This has the advantage of smaller form factors and weight of a complete navigation system, both of which are important in space and aerial applications. In one embodiment, all the components of the grid generator are packaged as a single unit. Additionally, the detector module array may have redundant detectors, such that high reliability can be achieved even if one or more detector modules fail during operation.

Figure 11:
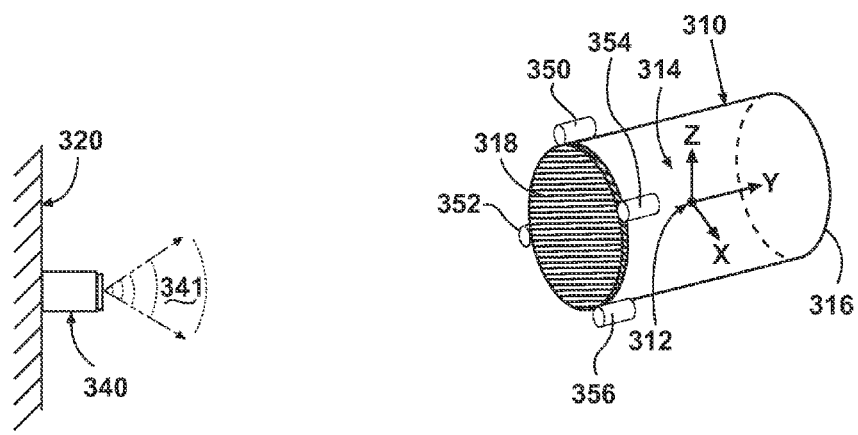
FIG. 11 is a schematic view of another embodiment of a relative navigation system where one of the two objects is immobile.

Illustrated in FIG. 11 is another embodiment of the present invention, wherein the second object 320 is not mobile and is fixed in location with a grid generator 340 attached thereon. This object 320 could, for example, be a wall or ceiling of a building. The first object 310 is a moving object with a front side 318, a rear side 316, a coordinate frame 314 with an origin 312, and with one or more detector modules attached thereon. In one embodiment, there are four detector modules 350, 352, 354, and 356. There is a field of transmission 341 of the radiation from the grid generator 340. This radiation is radiated in a manner to generate a plurality of projected intersecting lines. These projected lines are either elongated beam lines scanned in one direction or point beams raster scanned in substantially both the horizontal and vertical directions. In one embodiment the plurality of intersecting lines are further modulated to encode them distinctly from other of the plurality of intersecting lines. The detector modules 350, 352, 354, and 356 on the first object detect the position on the projected grid generated by the grid generator 340. The output of the detector modules are processed with algorithms to generate one or more of relative range, velocity, attitude and rate of attitude between the first object 310 and the second object 320 in a repeating time series manner. These measurements are then used for real time course correction of object 310 to achieve proper range and orientation of the first object 310 to the second object 320. It should also be noted that the first object may be moving in a two dimensional plane such as a car on a flat surface or in a three dimensional plane such as an aerial application.

Figure 12:
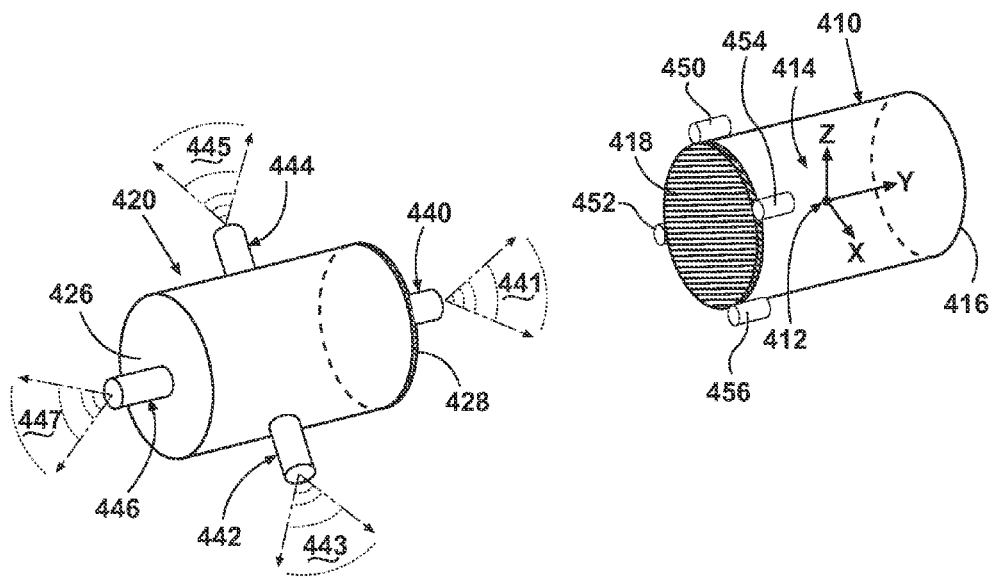
FIG. 12 is a schematic view of yet another embodiment of a relative navigation system with multiple grid generator devices.

FIG. 12 is another embodiment of the present invention, where there is a first object 410, with a front surface 418, a rear surface 416, with a reference coordinate system 414 with an origin 412 and several detector modules 450, 452, 454, and 456 attached thereon. The second object 420 in this embodiment has a front surface 428 and a rear surface 426 and has more than one grid generator attached thereon. Grid generators 440, 442, 444, and 446 have a field of transmission of 441, 443, 445, and 447 respectively. Several grid generators may be desirable in certain applications to enable navigation over a wider range of relative positions. In a single grid generator case, if none of the detector modules of first object are not within the projection of the grid generator then it might be difficult to navigate the first object to bring it within the field of projection of the grid generator. With multiple grid generators, the relative range, velocity, attitude and attitude rate may be determined in a greater volume of space surrounding the second object 420. When using multiple grid generators, an additional complexity of differentiating between the transmissions of the various grid generators must be addressed. In one embodiment, each of the grid generators encode the plurality of intersecting lines uniquely from the other grid generators, for example with a unique grid word for all lines, regardless of the grid generator that produced the line. In another embodiment, each grid generator may emit radiation of a distinguishably different wavelength from the other grid generators and the detector modules on the first object will be able to ascertain the grid generator by detecting the wavelength of the radiation. In this later embodiment, each detector module 450, 452, 454, and 456 may comprise more than one detector sensitive to the various wavelengths emitted by the several grid generators 440, 442, 444, and 446 located on the second object. Alternatively the detector modules may comprise one or more optical filters to detect different radiative wavelengths from more than one grid generator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A relative navigation system for at least two objects having relative movement, comprising:
   a grid generator provided on a first object and configured to project into space a plurality of modulated lines to form a grid defining a first relative reference frame associated with a first origin point on the first object, wherein the grid generator is configured to uniquely modulate each of the plurality of lines to encode a grid word comprised of multiple bits;
   a detector array comprising multiple detector modules provided on the other of the at least two objects, and configured to detect at least a portion of the grid and provide an output, wherein each of the multiple detector modules has a field of view large enough to allow the detection of the modulated grid word of at least one modulated line; and
   a controller provided on the other of the at least two objects, and configured to receive the output and determine at least one of a relative range and an attitude between the first object and the other of the at least two objects based on the output.

2. The system of claim 1 wherein the controller comprises a memory and a set of executable instructions provided in the memory.

3. The system of claim 2, wherein the set of executable instructions determine the at least one of the relative range and the attitude based on the output.

4. The system of claim 1 wherein the detector array comprises at least three detector modules, each providing an output to the controller.

5. The system of claim 4, wherein the at least three detector modules are not collinear.

6. The system of claim 1, wherein the grid generator comprises a radiation beam rastered to form the plurality of modulated lines.

7. The system of claim 6, wherein the radiation beam is a laser beam.

8. The system of claim 6, wherein the radiation beam is rastered in two substantially orthogonal directions.

9. The system of claim 1, wherein the other of the at least two objects further comprises at least one course corrector coupled to the controller to receive an input from the controller to correct the course of the other of the at least two objects based on the determined at least one of the relative range and the attitude.

10. The system of claim 9, wherein the at least one course corrector is provided on the other of the at least two objects having the detector array.

11. The system of claim 9, wherein the at least one course corrector is at least one of a thruster and a control surface.

12. The system of claim 1, wherein the plurality of lines intersect to form the grid, whereby the grid is comprised of intersecting lines.

* * * * *